Figure 1:
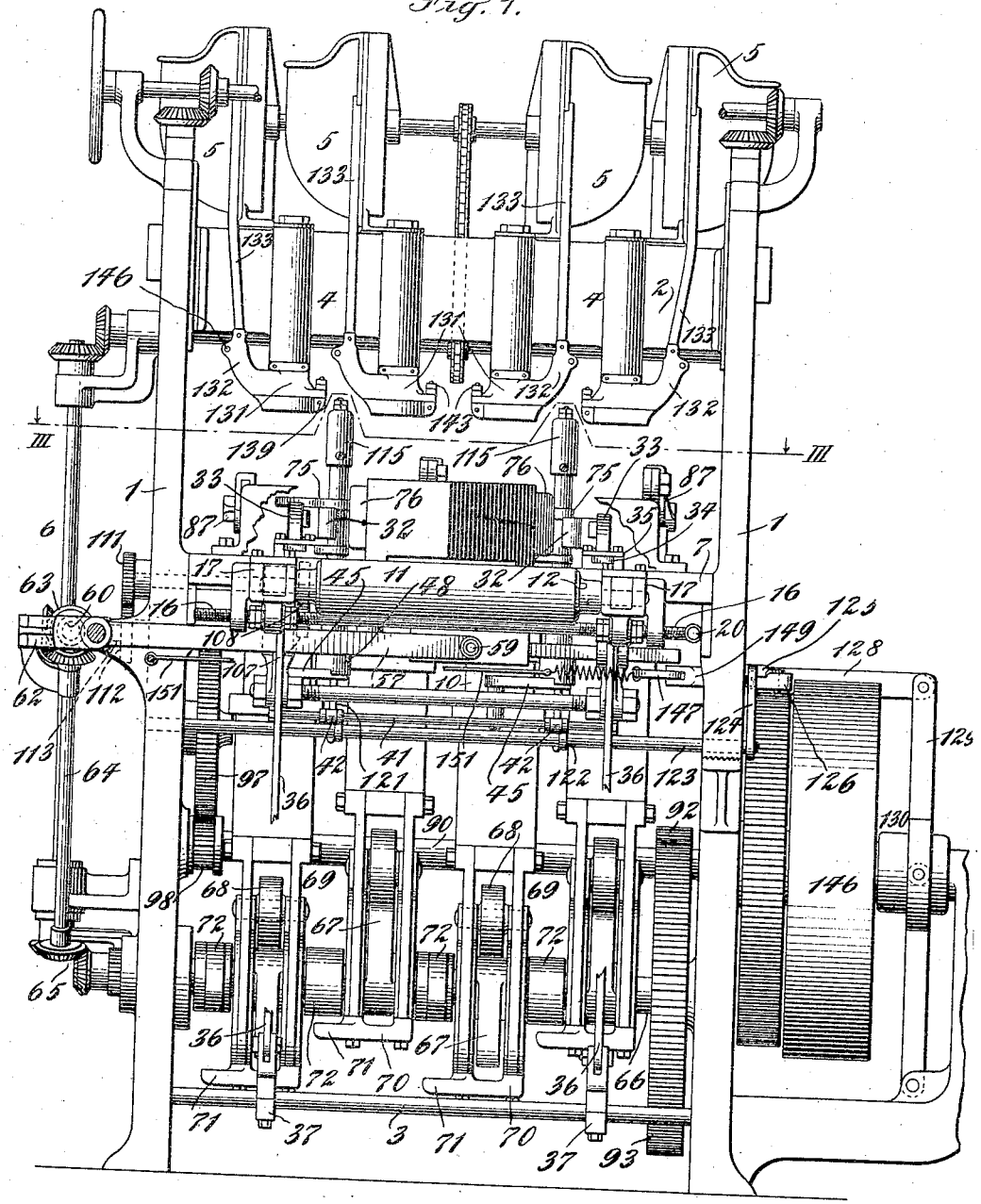

J. V. IRENIUS & C. B. WEAVER.
BOTTLE HANDLING MECHANISM.
APPLICATION FILED AUG. 28, 1912.

1,079,295.

Patented Nov. 18, 1913.
6 SHEETS—SHEET 3.

Witnesses:
Geo. E. Cheney
Chas. P. Hidden

Inventors
Joseph V. Irenius
Clayton B. Weaver
By their Attorneys
Kosenbaum & Stockbridge J. V. IRENIUS & C. B. WEAVER.
BOTTLE HANDLING MECHANISM.
APPLICATION FILED AUG. 28, 1912.
1,079,295.
Patented Nov. 18, 1913.
6 SHEETS—SHEET 4.
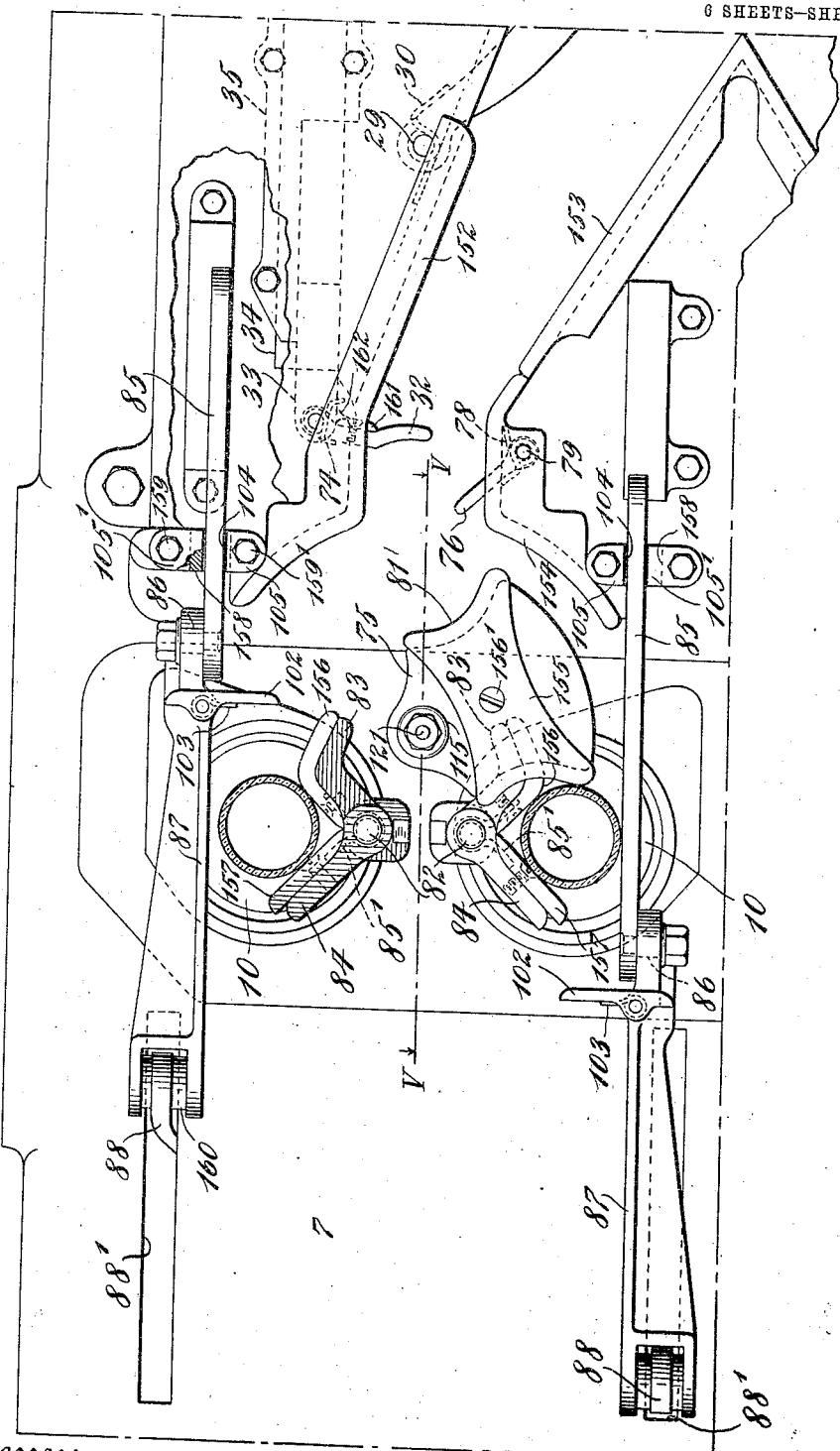

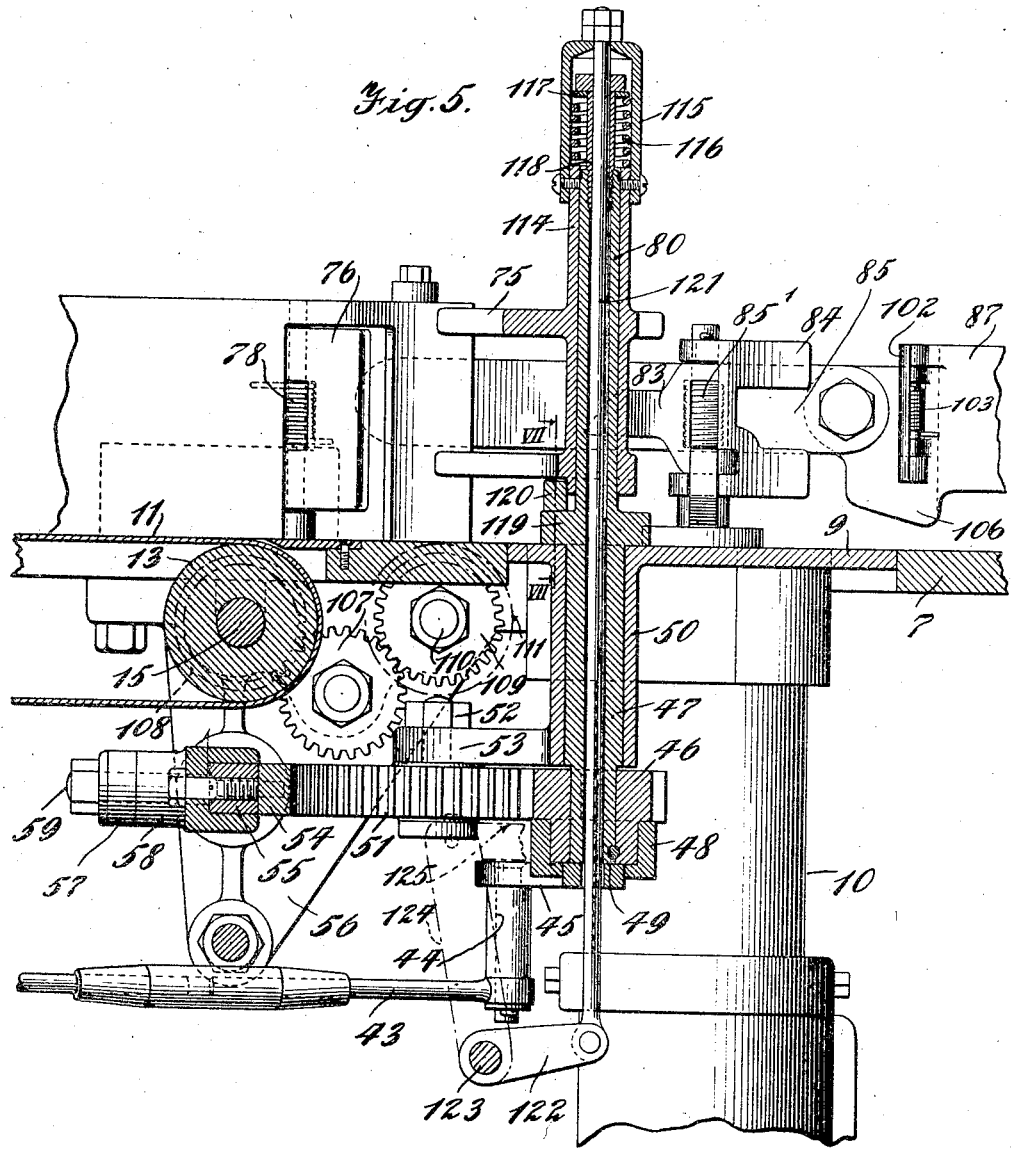

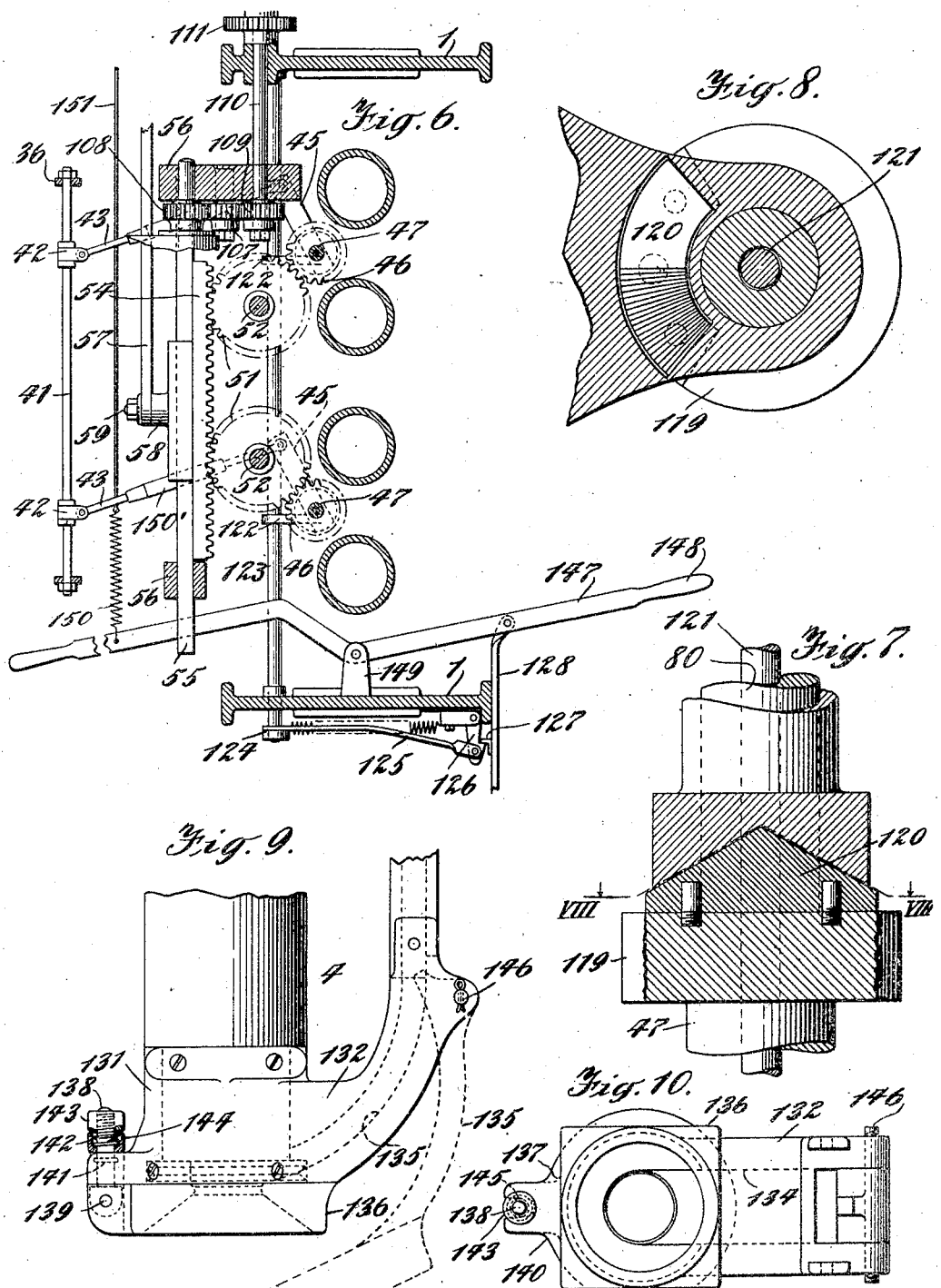

UNITED STATES PATENT OFFICE.

JOSEPH V. IRENIUS AND CLAYTON B. WEAVER, OF NEWARK, NEW JERSEY.

BOTTLE-HANDLING MECHANISM.

1,079,295.  Specification of Letters Patent.  Patented Nov. 18, 1913.

Application filed August 28, 1912. Serial No. 717,423.

*To all whom it may concern:*

Be it known that we, JOSEPH V. IRENIUS and CLAYTON B. WEAVER, citizens of the United States, residing at Newark, in the county of Essex and State of New Jersey, have invented certain new and useful Improvements in Bottle-Handling Mechanism, of which the following is a full, clear, and exact description.

This invention relates to shifting and feeding mechanisms and more particularly to apparatus for feeding bottles to a bottling appliance, such as a bottle sealing or capping machine, and particularly adapted to co-act therewith.

It has for one of its objects the provision of improved means for continuously delivering bottles, for example, to points in a suitable mechanism where said bottles may be capped, and thereafter delivering the bottles or receptacles so capped or sealed to convenient points at which they may be collected. In our pending application No. 623,794, filed April 27, 1911, we have described a mechanism of this general type; and while generally satisfactory, the therein described apparatus has been found in practice to give rise to the occasional breakage of bottles. The present machine has hence been developed as the result of an extended series of experiments looking to the production of a mechanism of this description which shall meet all of the numerous requirements of the trade. The conditions under which an automatically fed capping machine must operate are onerous and it is preëminently necessary that any material breakage of the bottles must be avoided.

The shifting and feeding mechanism herein described is especially applicable to capping machines having a plurality of preferably alined plungers and a corresponding number of capping heads, the heads being normally stationary; and we regard the present invention in certain of its aspects as involving a combination of the novel feeding elements employed and a capping machine proper of the fixed head, or plunger, type.

The foregoing and other objects of our invention will be hereinafter referred to and the novel elements and combinations of elements whereby the same may be attained will be more particularly set forth in the claims appended hereto.

In the drawings which form part hereof and in which like reference characters designate like parts throughout the several views, we have exemplified a preferred construction, but we are aware that various changes and modifications may be made herein within the purview of our invention and hence desire to be limited only by the scope of the said claims.

Figure 2:
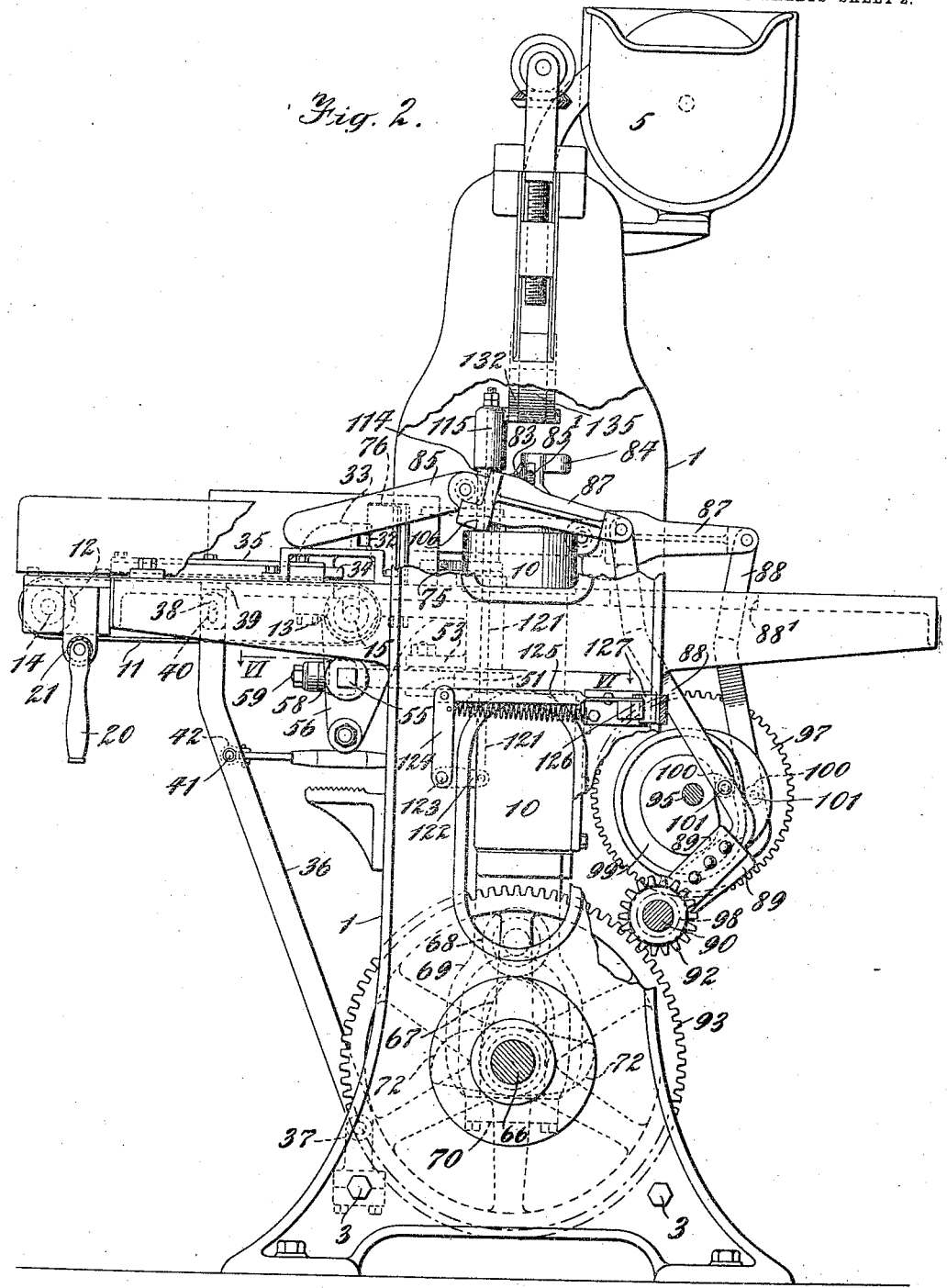
Figure 3:
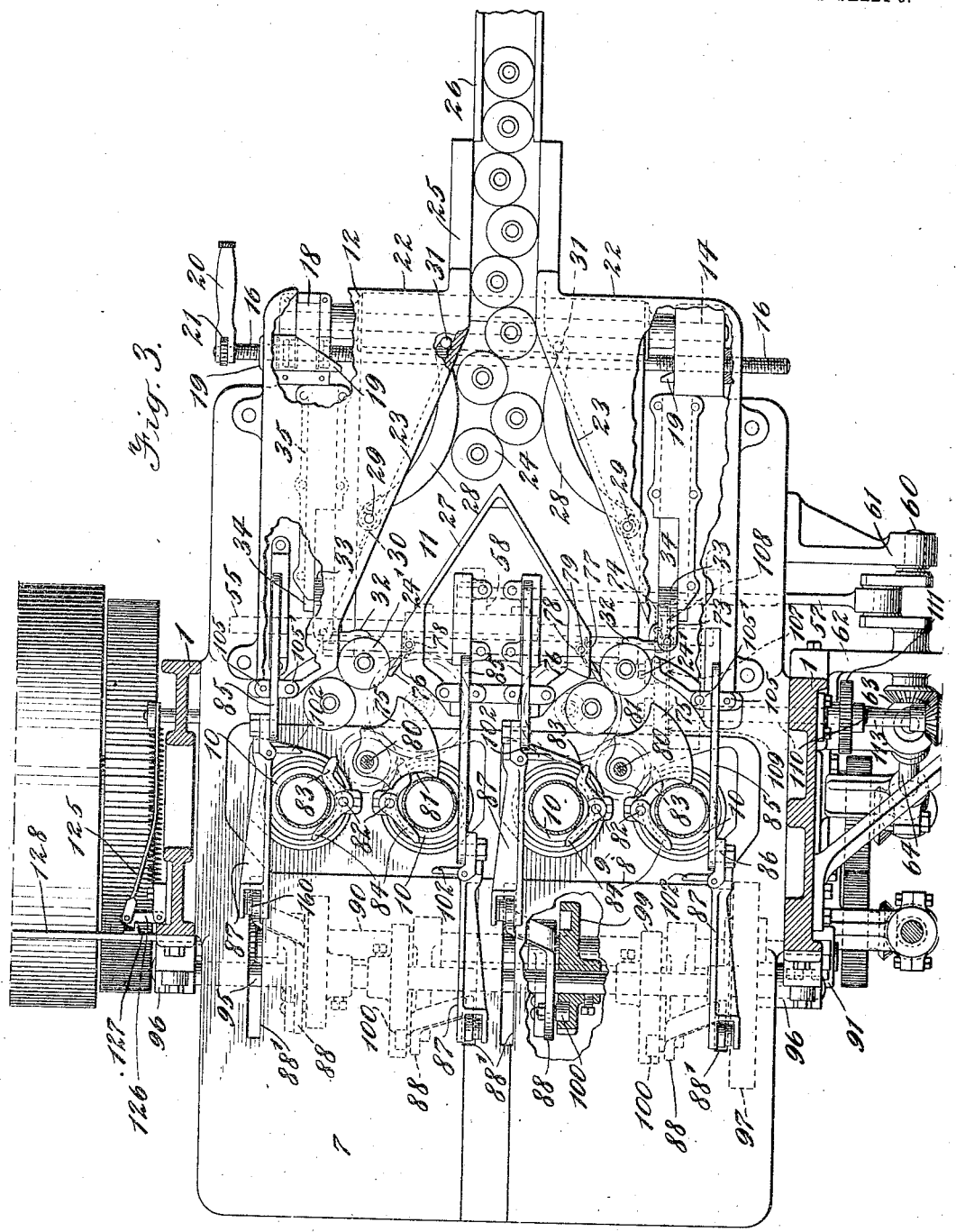

Referring to the drawings: Figure 1 is a front elevation of a preferred construction of bottle capping machine and automatic feed therefor; a portion of the guides and certain other parts being broken away for purposes of illustration. Fig. 2 is the right side elevation of said mechanism, again, with certain of the parts broken away. Fig. 3 is a horizontal section taken substantially on the line III—III of Fig. 1. Fig. 4 is a detail of a fragment of the guides and certain of the co-acting parts shown in Fig. 3, drawn to an enlarged scale. Fig. 5 is a fragmentary section drawn to a still larger scale, the section being taken on line V—V of Fig. 4. Fig. 6 is a somewhat fragmentary detail section taken on line VI—VI of Fig. 2. Fig. 7 is a detail section of a portion of the automatic stop, said section being taken on line VII—VII of Fig. 5. Fig. 8 is a horizontal section taken on line VIII—VIII of Fig. 7. Fig. 9 is a detail of the lower portion of one of the capping heads. Fig. 10 is a bottom view of said head.

Referring to Fig. 1, the capping machine therein shown comprises side frames 1 connected by a cross-head 2 and tie-rods 3; the cross-head carrying the capping heads, broadly designated 4, the latter being provided with feed hoppers 5 for the bottle caps, or the like. Insofar as these hoppers are concerned they form no part of the present invention and neither they nor their driving gear 6, indicated in said figure, need therefore be further herein discussed. Below the cross-head is a table 7 apertured as at 8 (Fig. 3) for the reception of an auxiliary table or plate 9 through which rise the upper extremities of the plungers 10. In the present instance these plungers are four in number, from whence the name of the machine, which is known to the trade as a "Quad" capping machine. The front of the table indicated at the left hand side of Fig. 2 is recessed for the reception of a belt 11 which is disposed around rollers 12 and 13, as best shown in Fig. 2. Rollers 12 and 13 are respectively mounted upon shafts 14 and 15 and the shaft 14, while maintained in parallelism with shaft 15, is provided with means for adjusting the distance there-between, whereby the belt 11 may be maintained under proper tension. Referring more particularly to Fig. 3, it will be observed that the spindle 16, provided at the respective ends thereof with right and left hand threads, extends through the brackets 17, one of which is disposed upon either side of the front edge of the table. Journals 18 for the shaft 14 are slidably mounted in these brackets; the inner side of each of these journals being beveled to adapt it for engagement with the corresponding face of a wedge block 19. These blocks are threaded on to the respective ends of the spindle 16 and the latter is provided with a handle 20 having a ratchet connection 21 with said spindle, said connection being merely diagrammatically indicated since it may be of any well known type. The mode of tightening the belt 11 will be at once apparent since it is obvious that by merely oscillating the handle 20, spindle 16 may be rotated and will thereby advance the wedge blocks inwardly toward each other pushing the journals 18 outwardly and thereby increasing the tension in the belt.

Two casings 22 are carried upon the front end of the table and the inner face 23 of each of these serves as one of the guides for the bottles 24 which are delivered over the table. A guide-way 25 projects forwardly from these casings and serves to direct the incoming bottles there-between, the bottles being delivered to said guide-way through a channel 26, or by any other desired medium of conveyance. It will be observed that the channel 26 is preferably adapted to receive the bottles in an upright position in such manner as to quite closely aline the same; while the recess in the guide-way 25 is of somewhat greater width than the diameter of the bottle, as a result of which the bottles are caused to arrange themselves in staggered relationship as they emerge from the channel 26, since the speed of the belt is preferably slightly less than the speed of the bottles advancing through channel 26. This feature of construction is of considerable importance since it co-acts with the prow or stem 27, the edge of which is preferably directly in the extended median line of the channel-way, to effect a proper distribution of the bottles. The latter are pushed through the channel 26 and guide-way 25 in any suitable manner, as for example, when they are delivered successively into the channel from the filler. After they have entered between the casings 22 a short distance, however, their bottoms are engaged by the belt 11 which thereafter positively advances them toward the plungers 10 of the capping mechanism.

Yielding guides 28, preferably of arcuate formation, project outwardly from the respective casings 22 into the path of the advancing bottles whereby to insure their proper disposition upon the belt at the time that they encounter the sides of the stem 27. These yielding guides may be pivoted as at 29 and are pressed laterally toward the bottles by means of coiled springs 30, the guide elements 28 being provided at their free extremities with suitable protuberances or stops 31 adapted for engagement with parts of the respective casings 22 whereby to limit the lateral movement of said elements. As the belt 11 advances the bottles toward the stem, by reason of the staggered disposition of said bottles they will be alternately delivered, first to one arm of the Y-shaped channel-way formed by the casings and stem 27, and then to the other arm of the same. The yielding guides 28 insure the prompt engagement of each bottle with the apportioned side of the stem, and the latter, being angularly disposed with respect to the line of travel of the belt, shifts the bottles across the belt outwardly toward the adjacent edge thereof. The stem further affords a certain support for the bottles while being so shifted; substantially obviating any likelihood of their becoming upset. The walls of the so formed channel ways for the bottles preferably taper toward each other as the plungers are approached so that when a bottle reaches the inner extremity of one of these channels it will be substantially supported upon opposite sides thereof in the event of its tending to upset.

A reciprocally mounted finger 32 is periodically interposed in each of the paths of the advancing bottles, said fingers respectively being carried upon extensions 33 which project upwardly from slides 34; one of said slides being mounted in suitable ways 35, secured to the table beneath a casing 22, upon either side of said table. The slides 34 are reciprocated by means of the levers 36, one of which is pivotally mounted upon either side of the machine, said levers being pivoted upon brackets 37 clamped upon the front tie-rod 3. The upper extremity of each of these levers is connected by means of a pin 38 with a depending extension 39 of the corresponding slide 34; said extension being slotted as at 40 to allow for the slight upward movement of the lever with respect to the slide. These levers are preferably connected together by a rod 41, as best shown in Figs. 1, 2 and 6. Collars 42 mounted upon the rod 41 afford means for connecting links 43 thereto. The inner extremity of each of these links is connected to a wrist pin 44 of a crank arm 45. Two of these arms are provided, each secured in a suitable manner to the hub of a pinion 46 which in turn is carried upon the reduced lower extremity of a hollow spindle 47. In the present instance sleeves 48 have been used as the means for securing these crank arms to the hubs of the pinions corresponding thereto, while cross pins 49 serve as the means for keying said pinions to their spindles 47, as shown in Fig. 5. These spindles are journaled in cylindrical extensions 50 which project downwardly from the underside of the plate 9; and each pinion 46 is driven by a corresponding gear 51 mounted upon a stud 52 carried in an arm 53 which projects laterally from the corresponding cylindrical extension. Gears 51 have an alternating rotary motion imparted thereto by means of a reciprocating rack 54, mounted upon a square bar 55 which extends through correspondingly apertured brackets 56 which depend from the underside of the table. Rod 55 is suitably connected to a link 57, as by means of an attachment 58 carrying a stud 59; the link 57 in turn being actuated by means of a cranked shaft 60 journaled in brackets 61, 62, carried respectively by the table and upon one of the side frames 1, as shown in Fig. 3. Rotary motion is imparted to the shaft 60 by suitable gearing 63 receiving power from a side shaft 64 of the capping machine. This shaft, it may be here stated, is driven by means of beveled gears 65, from the main cam shaft 66 of said machine which carries the cams which operate the plungers. These plungers are lifted through the instrumentality of cams 67 which engage rollers 68, each mounted in a forked guide bracket broadly designated 69, which depends from a plunger, each plunger being provided with one of these brackets. We particularly desire to call attention to the fact that each guide bracket 69 is provided with a cap 70 having a massive lateral extension 71 which is adapted for engagement with a down-thrusting cam 72. In our previous construction we depended upon gravity to force the plungers downwardly as the cams were swung around there-beneath but in practice we have found that owing to the conditions under which the machine must be operated, there is at times a tendency for these plungers to stick in their guide-ways so that they do not invariably descend. This is apt to result in a breakage of bottles since the latter are pushed positively onto the tables of the plungers in the manner hereinafter described. To effect, therefore, uninterrupted action of the mechanism we have provided these auxiliary cams 72 which insure that any given plunger shall be in its lowermost position when a bottle is moved there-toward by the quadrants presently to be described.

The fingers 32, operated by the slides 34, are pivotally connected to the extensions 33 of said slides as at 73, and are normally pressed out substantially at right angles to said slides into the positions in which they are shown in Fig. 3 by means of coiled springs 74, disposed around their pivoting pins. The fingers 32 are not free to swing backwardly with respect to their slides but may be swung or turned forwardly with respect thereto by the mere pressure of a bottle there-against. Hence they effectually serve to push the bottles as they reach the end of the respective tapered channel ways out into the path of the oscillating quadrants 75, while upon a backward stroke of the slide 34, i. e., toward the front of the table, the finger 32 carried thereby yields upon encountering the next bottle behind in the channel way and swings there-past, as soon as it is free to do so, preparatory to urging this bottle into the path of the quadrant upon the return stroke of the slide. A small gate or stop 76 is pivoted upon each side of the stem 27 adjacent the portion 77 thereof which is substantially in parallelism with the adjacent slide; and such gate is normally held at right angles to said portion 77 against a suitable stop by the action of a coil spring 78 disposed around the pivot pin 79 of said gate. While the gate is held against movement toward the front of the machine when thus disposed at right angles to the portion 77 of the stem, it is free to swing in the direction of the plunger when a bottle is pressed firmly thereagainst by the adjacent finger 32. The strength of the spring 78 is such as to enable the gate 76 to hold a bottle against the advancing action of the belt or apron 11 until said bottle is thus positively shifted by said finger 32.

The quadrants 75 above referred to are pivotally mounted upon the reduced upper extremity 80 of the spindles 47 above referred to. These spindles extending in substantial parallelism with the axes of the plungers and being disposed in a plane intermediate the axes of a pair of said plungers, the spindle axes however being nearer the front of the machine than the plunger axes, as shown in Fig. 3. By reason of this construction when a quadrant is oscillated in one direction and then in the other it is adapted to engage a bottle delivered into its path in the manner above described, receiving said bottle in one of the arcuately recessed sides 81 of the quadrant and conveying said bottle through substantially the arc of a circle, around to the table of a plunger. A stud 82 projects upwardly from the surface of this table; said stud being preferably upon the side of said table nearest the other plunger of a given pair of the same. This stud carries two spring pressed finger pieces one of which, designated 83, is knuckled or bent as shown, while the other, 84, is substantially straight. The details of these fingers are best shown in Fig. 5 wherein the spring which tends to close them together to a determined angle, has been designated 85'. It will be observed that the finger piece 84 is bifurcated while that designated 83 is substantially solid and is made narrower to be received freely between the upper and lower wings of the quadrant 75. The bifurcation of the piece 84 better adapts it to co-act with the piece 83; the bottle being engaged at three points.

As the quadrant swings a bottle on to the table of a plunger the bottle encounters the bent finger piece 83 which is so formed as to be readily pushed out of the way of the advancing bottle, but which thereafter presses against said bottle substantially at the knuckled portion of said piece, the pieces 83 and 84 co-acting to push the bottle toward a flat link 85, one of the functions of which is to aid in centering the bottle accurately upon a corresponding plunger. This link also has certain other functions which will now be discussed. The rear extremity of each link 85 is pivotally connected, as at 86, to a second link 87, the rear end of which in turn is pivotally connected to the upper extremity of a lever 88 which projects up through a slot 88' in the table. There are two of these levers, one upon either side of the machine, and their respective lower extremities are secured in bearing members 89 which are loosely mounted upon a shaft 90 which extends across the rear side of the machine and is journaled in brackets 91, carried by the side frames 1. Shaft 90 is driven by means of a pinion 92, secured thereupon, which is in mesh with a gear 93. The latter is secured upon the shaft 66 which carries the cams 67 and 72.

Above and somewhat to the rear of the shaft 90 is a shaft 95 journaled in brackets 96, as shown in Fig. 3. This shaft carries a gear 97 which is in mesh with a pinion 98 mounted upon the shaft 90 (Fig. 2). Shaft 95 is thereby driven from shaft 90 by a gearing which is so proportioned as to effect one revolution thereof for each revolution of shaft 66. Upon the shaft 95 are disposed two cams 99 provided with cam grooves in the sides thereof adapted for the reception of rollers 100. These latter are mounted on pins 101 upon the respective levers 88. Owing to the arrangement of gearing above described the levers 88 will be oscillated back and forth once for every revolution of the main cam shaft 66, and will hence push the links 87 and 85 alternately first toward the front of the machine and then toward the rear. The link 87 carries a pushing finger 102 which is similar in its action to the finger 32 previously described; being incapable of swinging toward the front of the machine beyond the position in which each of said fingers is shown in Fig. 4 by reason of its tail-piece coming against a shoulder on the link, but being adapted to readily yield in the opposite direction upon encountering a bottle. Light coiled springs 103 serve to normally hold these fingers 102 substantially at right angles to the links 87 to which they are pivoted.

The forward extremity of each flat or straight link 85, which it may be here stated is so termed owing to the fact that the side thereof which engages the bottle is preferably made substantially flat, rides in a groove 104 provided in a guide block 105. It will be observed, too, that the underside of the forward extremity of each link 87 is provided with a projection 106 which is adapted to ride upon the surface of the table of a plunger, as shown in Fig. 2; and in operation some portion of the linkage comprising the elements 85 and 87 will at all times be above a given plunger.

It is desirable to so dispose the cams 99 as to have a finger 102 move past a bottle while the latter is virtually clamped by the plunger against the capping head, so that the bottle may not be disturbed by the progress of this spring pressed finger thereover; and further to expedite the subsequent removal of the bottle from said plunger by having the corresponding finger 102 in position to promptly shift said bottle off from the plunger substantially immediately after the latter has descended to its lower level. It will be understood, of course, that the respective linkages in question, for a given pair of plungers, are actuated alternately since but one plunger of a given pair is occupied for capping purposes at a given time. In this connection it may be noted that while the plungers in a given pair of the same are actuated alternately, the plungers in the entire machine are also alternately actuated so that, referring to Fig. 1 and considering the plungers in order from the left in said figure, the first and third plungers will be in their lowermost positions when the second and fourth plungers are substantially in their uppermost positions. This mode of actuating the capping machine plungers is of considerable value in that it tends to distribute the load upon the machine more equally when in operation. If the two left-hand plungers were elevated simultaneously, and thereafter the two right-hand plungers were also elevated simultaneously, the thrust upon the main cam shaft would be transmitted mainly first to one bearing thereof and then to the other, whereas by operating in the manner above described, this thrust is quite evenly distributed upon both of said bearings. It also distributes the upward thrust upon the cross-head more evenly.

The shaft 15 upon which is mounted the roll 13 which drives the belt 11, is driven through the intermediacy of an idler 107 which is in mesh with a gear 108 mounted upon shaft 15 and which is also in engagement with a gear 109, mounted upon a stud shaft 110 which extends through and is carried in part by the side frame 1 to which is affixed the bracket 62. Upon the outer extremity of this stud shaft is mounted a gear 111 which is driven by a gear 112 immediately therebelow, the latter being mounted upon a short shaft 113, driven by a beveled gear which constitutes an element of the gearing 63 previously referred to.

Provision is made in the event of a bottle becoming displaced or broken upon the machine, for automatically stopping the latter. To this end each quadrant 75 is provided with an upwardly extended hub 114 which carries a cap 115, within which is disposed a coiled spring 116. The latter end of this spring is seated upon the upper edge of the hub 114 while the upper end of said spring bears against the flange 117 of a sleeve 118, the lower extremity of which is threaded into the interior of the reduced end of the hollow spindle 47.

As best shown in Figs. 5, 7 and 8, a wedge-like connection is provided between the lower extremity of a given quadrant 75 and its hollow spindle. Said spindle is provided with a shoulder 119 upon one side of the upper face of which is a lug 120 the upper face of which has substantially the form of an inverted V. The hub at the lower extremity of the quadrant is provided with a recess at one side thereof adapted for engagement with this V-shaped lug and the spring 116 normally holds these parts together. When, however, a bottle becomes inadvertently upset, or in any other manner becomes so positioned as to prevent the proper shifting thereof by the quadrant to the table of the plunger toward which the latter is moving at such time, the spindle 47 will continue to be positively rotated but a slippage will occur between such part and the quadrant which it carries, as a result of which action the latter will be elevated through the instrumentality of the V-shaped lug 120 compressing the spring 116 and, of course, elevating the cap which is disposed therearound. The rod 121 extends downwardly from this cap through the sleeve 118 and the hollow spindle, and is secured at its lower extremity to a crank arm 122 mounted upon a rock shaft 123 which extends through and is journaled in the side frames of the machine as shown in Fig. 6. One extremity of this rock-shaft carries a spring pulled arm 124 which extends upwardly therefrom, as shown in Figs. 2 and 6, and the upper extremity of which is connected to a link 125. This in turn is pivotally connected to a latch 126 which is adapted for engagement with an extension 127 upon a link 128. The latter extends to the lever 129 which operates the clutch 130 upon the main driving shaft 90 of the machine (Fig. 1). Hence the elevation of either quadrant, since both of them are connected in the manner described with the shaft 123, serves to release the clutch and to thereby deprive the machine of power.

We have described the preferred means of stopping the operation of the machine in the event of a bottle becoming overturned, so as to substantially obviate breakage of bottles, and in this connection one other feature may be noted. This concerns the construction of the capping heads whereby in the event of breakage of the head of a bottle therein the fragments of glass may be readily removed. In Figs. 9 and 10 the heads 4 are each shown as provided with a casing 131 having an extension 132 to which is attached the lower extremity of the bottle-cap chute 133 which leads downwardly thereto from the corresponding hopper 5. The casing 131 and its extension are slotted as at 134 for the reception of the suspending arm 135 of a bottle head guide 136. This latter, as shown in Fig. 10 may be square, if desired, and is provided upon the edge thereof, opposite to its arm 135, with a lug 137. This lug is recessed for the reception of the head of an eye-bolt 138 which is pivotally connected thereto, as at 139; while the casing 132 is provided with a correspondingly slotted lug 140 adapted for the reception of the body of this pivoted eye bolt in a well known manner. The bolt 138 may be provided with a shoulder 141 to prevent a spring pressed sleeve 142 from becoming unduly displaced thereupon. Finally, the end of the bolt is threaded for engagement with a nut 143 against the under surface of which the upper extremity of a spring 144, disposed within the sleeve 142, normally presses. Normally the nut 143 is not jammed tight against the sleeve 142 but the spring 144 is merely placed sufficiently under compression by said nut to hold the bolt against inadvertent displacement, when disposed as shown in Fig. 9. Should the bottle head break within the capping head, it is merely necessary to jerk the nut 143 sidewise when the spring 144 will yield sufficiently to allow said bolt to be drawn out of the open slot 145 in the lug 140 whereupon the guide 136 will drop by its own weight remaining suspended, however, from the extension 132, owing to the pivotal connection 146 which is provided between the arm 135 and the said extension. The dropping away of this guide exposes the interior of a capping head and permits the fragments of glass to fall out.

The operation of the entire mechanism is as follows: The shaft 90 is driven by means of a pulley 146 through the instrumentality of the clutch 130, the latter being maintained at such time in its operative position by reason of the engagement of the latch 126 with the projection 127 of link 128. This engagement is effected by means of the bent lever 147, shown in Fig. 6, said lever being preferably provided at opposite extremities thereof with handles 148 and being pivotally mounted upon a bracket 149, secured to one of the side frames 1. Power is transmitted from the shaft 90 through the gears 92 and 93 to the main cam shaft which effects a periodic elevation of alternate plungers 10 in the manner described. Power is taken off from the main cam shaft at the left hand extremity thereof, as shown in Fig. 1, by means of gears 65 and shaft 64, whereby the belt 11 is continuously driven through its connecting train of gears; while correspondingly, through its connection with the crank shaft 60, driven by gears 63, the rack 54 is reciprocated, which in turn imparts an oscillatory motion to the quadrants 75 through the intermediacy of the gears 46, 51 and associated parts. The continuous driving of the spindles upon which are mounted said quadrants effects the oscillation of the levers 36 by means of the crank arms 45, links 43 and cross rod 41. The links 43, it may be here noted, are provided with suitable means 150' for adjusting the lengths thereof, said means in the present instance being turn buckles. The oscillation of the levers 36 effects the reciprocation of the slides 34 and their pusher fingers 32. Finally, the shaft 95, carrying the cams 99, is rotarily driven by the meshed gears 97, 98, the latter upon the shaft 90 and the rotation of said cams effects reciprocation of the respective connected links 85–87, by means of the levers 88. Bottles are delivered toward the machine through the channel 26 and stagger themselves in the channel-way 25 in the manner described, being thereafter advanced by the belt 11 toward the stem 27. The forward end or edge of this part effects an alternate distribution of the advancing bottles first into one arm and then into the other of the Y-shaped passage leading toward the plungers; but the gates 76 hold any bottle which reaches the end of one of these arms until the proper instant for the admission of said bottle into the path of the corresponding quadrant. When the quadrants are disposed as shown in Fig. 3, the fingers 32 are in engagement with the rear sides of the bottles 24' which are shown as in the act of passing the gates 76. From these points said bottles are shifted a short distance farther by the fingers 32 toward the line of plungers, whereupon they are engaged by the respective quadrants. The outer edges of the quadrants, intermediate the arcuate edges 81, are substantially concentric with the axes of rotation of the quadrants, so that even if by chance a gate 76 should not be effectively in position to withstand the advance of a bottle toward a given quadrant, this outer quadrant edge would merely slip over the surface of the bottle preventing it from emerging farther past the gate until the quadrant had swung completely aside. Should the bottles which are being advanced become unduly crowded prior to or immediately after encountering the stem 27 the yielding guides 28 will be pressed outward toward the respective sides of the machine affording more room for the bottles; but the springs 30 will exercise a tendency to return these yielding guides to their normal positions, so that immediately after the congestion becomes abated they will resume the position in which they are shown in Fig. 3.

After the fingers 32 have shoved the bottles 24' into the paths of the respective quadrants, said fingers are withdrawn toward the front of the machine and snapped past the bottles immediately to the rear, preparatory to pushing these bottles in their turn. The two quadrants swing the bottles which have been moved into engagement therewith around toward the respective plungers at the instant when said plungers are in their lowermost positions; and of course said bottles are alternately seated upon the respective plungers of a given pair of the same: a pair of bottles being simultaneously seated, one upon, let us say, the right hand plunger of one pair of the latter, and the other bottle of said pair upon the corresponding plunger in the other pair of the same. The centering devices comprising the fingers 83 and 84 and the flat link 85 in each case accurately locate the bottle upon the table of a plunger, whereupon the quadrant which has so seated the bottle swings out of the way and the plunger is then elevated by its cam; driving the bottle up toward the corresponding capping head. Previous to this elevation of a given plunger, a bottle cap has been seated in the capping head there-above, having been delivered thereto from the corresponding hopper 5; and the bottle is thereupon sealed by being driven together with its cap up into the capping head in a known manner. While being so sealed however the corresponding connected links 85–87 have been moving forwardly toward the front of the machine until the finger 102 carried by the link 87 thereof has been wiped past the bottle; when, as soon as the plunger, upon the table of which said bottle is seated, has descended to its lowermost position, the said finger shifts the bottle toward the rear of the table; the centering finger 84 yielding to permit of this action. Should the belt 11 become stretched, as is apt to be the case after continued use for an extended period, it may be readily given the desired tension by oscillating the handle 20 in the manner described. Should a bottle become so disposed as to render impossible its proper delivery to its plunger by the corresponding quadrant, the said quadrant will yield and in so doing will be elevated in the manner described, which rocks the shaft 123 and thereby trips the latch 126. Thereupon, the spring 150, one end of which is attached to the lever 147 and the other end of which is connected to a rod 151 attached to the left-hand frame 1, draws the lever 147 to its clutch releasing position, and stops the machine. If the breakage of a bottle has been such as to leave fragments thereof in one of the capping heads, such fragments may be readily removed in the manner described. Finally, means are provided for accommodating the feeding and centering mechanism to bottles of different sizes, e. g., quarts, pints, etc.

Referring to Fig. 4, it will be noted that supplemental guides 152, 153, 154 may be secured, in any suitable manner, over the guide walls of the respective elements which form the Y-shaped passageway the arms of which lead toward the alined plungers. This reduces the width of said passage arms at the points of delivery therefrom, so that a bottle of less diameter than that for which the guide casings 22 and stem 27 are adapted may be properly supported when being advanced through said arms. Correspondingly the quadrants may be provided with shoes 155, secured thereto, if desired, by screws 156'; and the recesses 81' in the sides of these shoes are adapted to fit these smaller bottles, so that the latter may be properly shifted onto the plungers despite their reduced size. To insure the centering of these bottles with respect to the capping heads, liners 156, 157 may be secured to the bottle engaging faces of the centering elements or fingers 83, 84, respectively, while the sliding guides or flat links 85 are displaced laterally toward the axes of the respective adjacent plungers by transposing a cap 105'; having a downwardly directed flange 158 which is received into the groove 104 of each block 105, from one side of said block to the other. Thus in Fig. 3, considering the upper guide block 105, it will be noted that the cap 105' thereof, held in place by a securing bolt 159, is on the side toward the plungers, the link being set for, let us say, "quarts;" while in Fig. 4, the cap 105' is on the other side and is held in place by the other securing bolt 159' of the slotted block. If this were the only change effected in so far as a link 85 was concerned, said link would be askew, so that it is necessary to correspondingly displace the pivoted end thereof. This is readily accomplished by shifting a washer 160 from one side of the extremity of the lever 88 to the other, as shown in Figs. 3 and 4. Thus both members 85 and 87 are laterally displaced with respect to the corresponding plunger in parallelism with their former positions. One other point in this connection remains to be considered, namely, the alteration in the path of travel of the bottle engaging end of the shifting fingers 32. One mode of accomplishing this is to swivel said fingers around slightly so that they are no longer disposed at the same angle with respect to their slides 34. To this end a pad 161 may be fastened on the side of a given finger 32 which normally engages the stop 162 carried by the arm 33 of the corresponding slide, so that this pad is interposed between said stop and the finger. This maintains the finger end somewhat nearer the quadrant axis and hence adapts it to properly position a smaller diametered bottle in the path of said quadrant.

It will hence be seen that we have provided a mechanism, all parts of which are adapted to efficiently co-act, to the end that a constant stream of bottles of any determined size may be delivered to the plungers of said machine preparatory to capping said bottles, while thereafter the capped bottles are displaced from the plungers to a position where they may be conveniently removed from the mechanism.

In practice this machine has given extraordinarily good results, the breakage of bottles being practically entirely eliminated, while the mechanism has a capacity for capping as high as 180 or more filled bottles per minute.

Having described our invention, we claim:

1. In combination with a bottle capping machine, means for delivering filled bottles to the cap applying parts thereof while maintaining said bottles in a substantially upright position, and co-acting means for removing said bottles from said cap applying parts, after the caps have been applied to said bottles, each of said means comprising a movable yielding finger adapted for engagement with a bottle whereby to displace the same, said finger of said first mentioned means being movable toward and from one of said cap applying parts in a path located to one side of the latter, and said finger of said second mentioned means being movable toward and from the same cap applying part in a path located upon another side of said part, each of said fingers being adapted to slip past a bottle when in engagement therewith when moving in a direction opposite to the course of travel of bottles through said machine, and means for actuating said first and second mentioned means in timed relationship to each other.

2. In combination with a bottle capping machine, having cap applying parts and actuating mechanism therefor including a clutch, mechanism for feeding filled bottles in a substantially upright position to said cap applying parts and connections between a part of said feeding mechanism and said clutch, said connections operable by a bottle improperly positioned in said feeding mechanism.

3. In combination with a power driven bottling appliance having a bottle engaging part and actuating mechanism therefor, means for successively feeding bottles to said part, including a bottle shifting device and a guide co-acting therewith, and automatic means for stopping said actuating mechanism when a bottle becomes improperly positioned with respect to said shifting device and guide.

4. In combination with a bottle capping machine having a plunger and a capping head in line with said plunger, means for centering bottles on said plunger with respect to said head, said means comprising a structure adapted for engagement with portions of the side walls of a bottle, a co-acting member adapted for engagement with a portion of said bottle substantially opposite to those engaged by said structure, said member being laterally movable with respect to said plunger, means for supporting said member in part only upon said plunger, and means for moving said member to and fro.

5. In combination with a bottle capping machine having a plunger and a capping head in line with said plunger, means for centering bottles on said plunger with respect to said head, said means comprising a structure adapted for engagement with portions of the side walls of a bottle, said structure being mounted upon said plunger, a co-acting member adapted for engagement with a portion of said bottle substantially opposite to those engaged by said structure, said member being laterally movable with respect to said plunger, means for supporting said member in part only upon said plunger, and means for moving said member to and fro.

6. The combination of a bottling appliance having a plunger, with feeding mechanism for moving bottles into alinement with and away from said plunger, said mechanism comprising an element mounted to ride back and forth over a part of said plunger while the latter is in motion, said element having means for engaging the side of a bottle whereby to shift said bottle with respect to said plunger.

7. The combination of a bottling appliance having a plunger, with feeding mechanism for moving bottles into alinement with and away from said plunger, said mechanism comprising an element carried in part at least by said plunger and also movable with respect thereto, means, carried by said element, for engaging bottles, and means normally in engagement with said element for effecting lateral movement thereof in accordance with a movement of said plunger.

8. The combination of a bottling appliance having a plunger, with feeding mechanism for moving bottles into alinement with and away from said plunger, said mechanism comprising a reciprocably mounted element carried in part at least by said plunger and also movable with respect thereto, means, carried by said element, for engaging bottles, and means normally in engagement with said element for effecting lateral movement thereof in accordance with a movement of said plunger.

9. The combination of a bottling appliance having a plunger, with feeding mechanism for moving bottles into alinement with and away from said plunger, said mechanism comprising an element carried in part at least by said plunger and also movable with respect thereto, means, carried by said element, for engaging bottles, and means normally in engagement with said element for effecting lateral movement thereof in accordance with a movement of said plunger.

10. The combination of a bottling appliance having a plunger adapted to support a bottle, with means for removing said bottle from said plunger, said means including a member mounted for lateral movement with respect to said plunger and adapted to be supported at least in part thereby when said plunger is raised, means carried by said member for engaging said bottle, and mechanism for reciprocating said member.

11. The combination of a bottling appliance having a pair of plungers and means for elevating said plungers alternately, with a bottle feeding mechanism comprising an oscillating member adapted to shift bottles toward said plungers alternately, a stem, said member being yieldingly mounted on said stem for movement axially thereof, means for rocking said stem about its axis, and means whereby said member is displaced longitudinally of said stem when oscillatory movement of said member is resisted.

12. The combination of a bottling appliance having a pair of plungers and means for elevating said plungers alternately, with a bottle feeding mechanism comprising an oscillating member adapted to shift bottles toward said plungers alternately, a stem, said member being yieldingly mounted on said stem for movement axially thereof, means for rocking said stem about its axis and driving connections between said stem and said member, including means whereby said member is displaced longitudinally of said stem when oscillatory movement of said member is resisted.

13. The combination of a bottling appliance having a pair of plungers and means for elevating said plungers alternately, with a bottle feeding mechanism comprising an oscillating member adapted to shift bottles toward said plungers alternately, a stem, said member being yieldingly mounted on said stem for movement axially thereof, means for rocking said stem about its axis, and wedge acting means whereby said member is displaced longitudinally of said stem when oscillatory movement of said member is resisted.

14. In bottle handling machinery, the combination of a plunger, a pusher finger for shifting bottles with respect to said plunger, means for moving said finger through a determined path, said finger being normally disposed at an angle to said path, and means for adjusting said finger to accommodate bottles of different sizes, said means comprising a device for changing the normal angular disposition of said finger with respect to said path.

15. In bottle capping machinery, the combination of a capping head and a plunger, bottle centering parts mounted on the latter, a member mounted for movement to and fro, said member adapted to co-act with said parts for centering bottles on said plunger with respect to said head, means for moving said member to and fro, and means for adjusting said member and parts to fit bottles of different sizes.

16. In combination with a power driven bottling appliance having a bottle engaging part and actuating mechanism therefor, means for feeding bottles to said part, including a bottle shifting device adapted to shift bottles while in a substantially upright position, and means for automatically stopping said actuating mechanism when a bottle becomes improperly positioned with respect to said shifting device.

In witness whereof, we subscribe our signatures, in the presence of two witnesses.

JOSEPH V. IRENIUS.
CLAYTON B. WEAVER.

Witnesses as to the signature of Joseph V. Irenius:
MARTIN MANN,
LELA GEIGER.

Witnesses as to the signature of Clayton B. Weaver:
EDWARD G. JOHNS,
RICHARD WILLIAMS.